United States Patent [19]

Beauch et al.

[11] Patent Number: 5,129,280
[45] Date of Patent: Jul. 14, 1992

[54] ADJUSTABLE STEERING COLUMN WITH COLUMN POSITION INDICATING APPARATUS

[75] Inventors: Howard D. Beauch, Frankenmuth; Scott A. Norris, Burton, both of Mich.

[73] Assignee: General Motors Corporation, Detroit, Mich.

[21] Appl. No.: 752,345

[22] Filed: Sep. 3, 1991

[51] Int. Cl.$^5$ .................... B60Q 11/00; B62D 1/18
[52] U.S. Cl. .................................. 74/493; 74/541; 280/775; 116/28 R
[58] Field of Search .............. 116/28 R, 31; 74/493, 74/541; 280/775

[56] References Cited

U.S. PATENT DOCUMENTS

| | | | |
|---|---|---|---|
| 2,074,334 | 3/1937 | Hughes | 74/493 |
| 3,216,521 | 11/1965 | Ulrich | 180/78 |
| 3,533,302 | 10/1970 | Hansen | 74/493 |
| 3,691,866 | 9/1972 | Berkes | 74/493 |
| 3,824,948 | 7/1974 | Faloon | 116/124 |
| 3,851,543 | 12/1974 | Krom | 74/493 |
| 4,261,282 | 4/1981 | Satou et al. | 74/493 X |
| 4,543,848 | 1/1985 | Beauch | 74/493 |
| 4,691,587 | 9/1987 | Farrand et al. | 280/775 X |
| 5,067,747 | 11/1991 | Yokoyama | 74/493 X |

*Primary Examiner*—Richard Lorence
*Assistant Examiner*—Khoi Q. Ta
*Attorney, Agent, or Firm*—Saul Schwartz

[57] ABSTRACT

A steering column including a steering wheel mounted on a tilt-housing of the steering column for up and down pivotal movement about a first transverse axis and a shroud or bezel on the tilt-housing. The shroud has a viewing port therein and a drum is supported on the tilt-housing behind the shroud for rotation about a second transverse axis parallel to the first transverse axis. An outer cylindrical wall of the drum having graphic symbols thereon is partially visible through the viewing port so that the symbols scroll across the viewing port as the drum rotates about the second transverse axis. A connecting rod has a first end pivotally connected to a stationary part of the steering column and a second end pivotally connected to a side of the drum eccentric relative to the second transverse axis so that the drum rotates about the second transverse axis concurrently with up and down pivotal movement of the tilt-housing.

4 Claims, 3 Drawing Sheets

ADJUSTABLE STEERING COLUMN WITH COLUMN POSITION INDICATING APPARATUS

FIELD OF THE INVENTION

This invention relates to tilt-adjustable automotive steering columns.

BACKGROUND OF THE INVENTION

U.S. Pat. No. 4,543,848, issued Oct. 1, 1985 and assigned to the assignee of this invention, describes a tilt-adjustable automotive steering column including a stationary mast, a tilt-housing pivotable up and down relative to the mast about a transverse axis thereof, a steering wheel rotatably supported on the tilt-housing, and a manually actuated tilt-latch between the mast and the tilt-housing. A tilt-adjustable steering column according to this invention includes the apparatus such as described in the aforesaid U.S. Pat. No. 4,543,848 and, in addition, a simple and economical position indicating apparatus for indicating the vertical position of the steering wheel so that a driver may quickly readjust the steering wheel to a previously determined, personally comfortable position.

SUMMARY OF THE INVENTION

This invention is a new and improved tilt-adjustable automotive steering column having a mast, a tilt-housing supported on the mast for pivotal movement about a transverse axis of the mast between high and low limit positions, and a tilt-latch for capturing the tilt housing in any of a plurality of adjusted positions between the high and low limit positions. The steering column according to this invention further includes a bezel or shroud on the tilt-housing having a viewing port therein. An indicator surface having graphic position symbols thereon is supported on the tilt-housing behind the bezel for movement across the viewing port. Synchronizing apparatus between the indicator surface and the mast moves the surface across the viewing port as the tilt-housing pivots between its high and low limit positions so that in an adjusted position of the tilt-housing a corresponding one of the graphic position symbols is visible in the viewing port. In a preferred embodiment, the indicator surface is an outside wall of a drum rotatably supported on the tilt-housing and the synchronizing apparatus includes a connecting rod attached to the mast and to the drum eccentrically relative to the axis of rotation of the drum. In another preferred embodiment, a flat coiled spring is employed instead of a connecting rod, the spring coiling and uncoiling as the tilt-housing pivots to rotate the drum.

DESCRIPTION OF PREFERRED EMBODIMENTS

Figure 1:
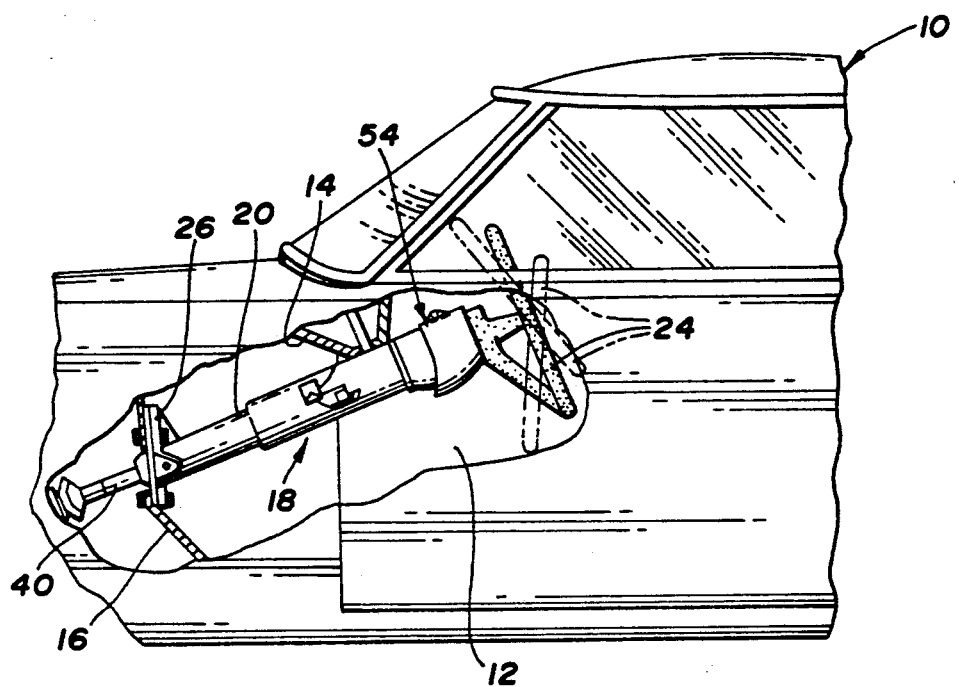
FIG. 1 is a partially broken-away elevational view of an automobile having thereon a steering column according to this invention.
Figure 2:
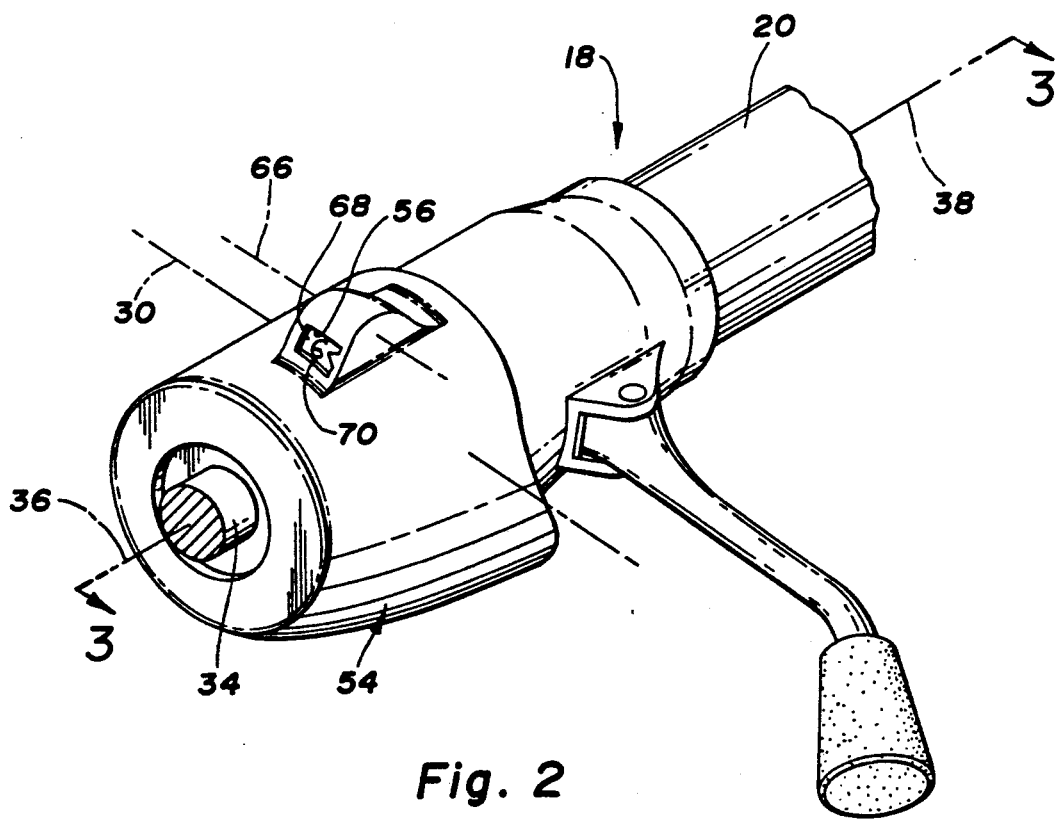
FIG. 2 is a fragmentary perspective view of the steering column according to this invention.

Referring to FIGS. 1 and 2, an automobile body 10 includes a passenger compartment 12, an instrument panel support 14, and a forward wall 16 defining the front extremity of the passenger compartment. A tilt-adjustable steering column 18 according to this invention is mounted in the passenger compartment below the instrument panel support.

As described in the aforesaid U.S. Pat. No. 4,543,848 the steering column 18 includes a mast 20, a tilt-housing 22, and a steering wheel 24. The lower end of the mast is connected to the forward wall 16 at a bracket 26 and the upper end of the mast is connected to the instrument panel support 14. The tilt-housing 22 is connected to a yoke 28 on the upper end of the mast 20 through a pair of laterally spaced pins aligned on a first transverse axis 30 of the mast, only a single pin 32 being shown in FIG. 3.

Figure 3:
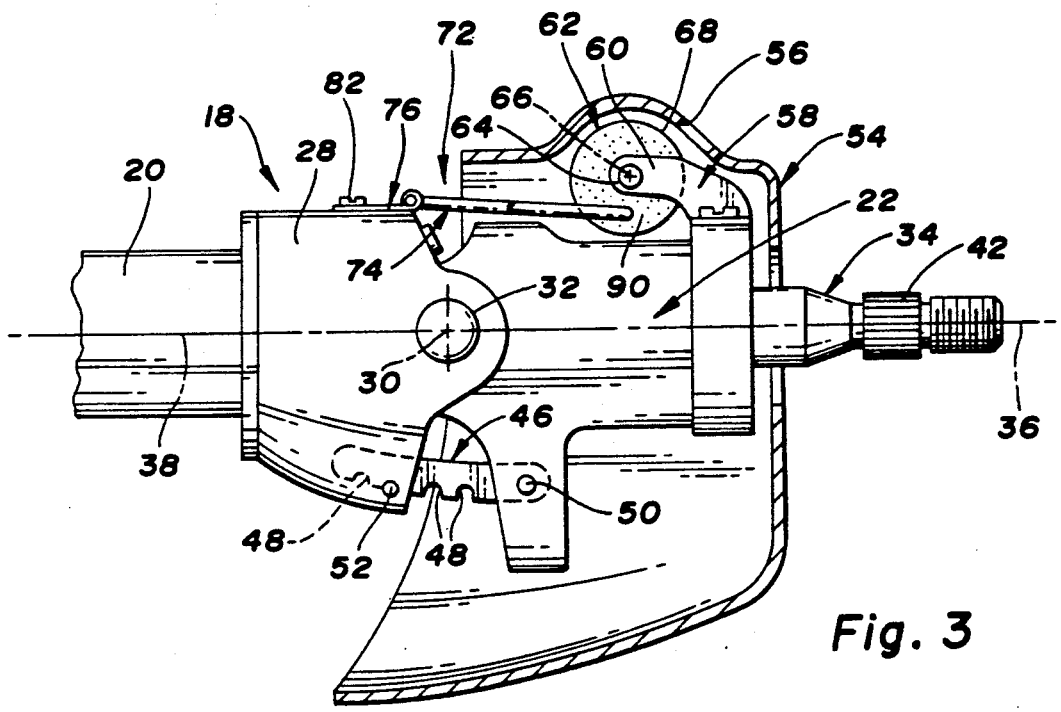
FIG. 3 is a sectional view taken generally along the plane indicated by lines 3—3 in FIG. 2.

An upper steering shaft 34, FIGS. 2-3, is mounted by bearings, not shown, on the tilt-housing for rotation about a centerline 36 of the tilt-housing which intersects a centerline 38 of the mast at the transverse axis 30. The upper steering shaft is connected to a lower steering shaft 40, FIG. 1, in conventional fashion by a universal joint, not shown, centered on the transverse axis 30. The steering wheel 24 is attached to the upper steering shaft 34 at a serrated end 42 of the latter. The tilt-housing 22 supports the steering wheel on the mast 20 for up and down pivotal movement about the first transverse axis 30 between high and low limit positions illustrated in broken lines in FIG. 1.

A latch shoe 46 having a plurality of notches 48 in an edge thereof is mounted on a pin 50 on the tilt-housing 22 for pivotal movement between a latched position, FIG. 3, wherein one of the notches 48 engages a striker 52 on the yoke 28, and an unlatched position remote from the striker. In the latched position of the shoe 46, the tilt-housing is pivotally immobilized relative to the mast 20. In the unlatched position of the shoe 46, the tilt-housing is freely pivotable about the first transverse axis 30 for up and down adjustment of the steering wheel 24. As the tilt-housing pivots, successive one of the notches 48 achieve registry with the striker 52. Each notch, therefore, defines one of a plurality of adjusted positions of the tilt-housing 22. A driver actuated lever, not shown, on the mast moves the shoe 46 from its latched position to its unlatched position and a spring, not shown, moves the shoe in the opposite direction.

Figure 4:
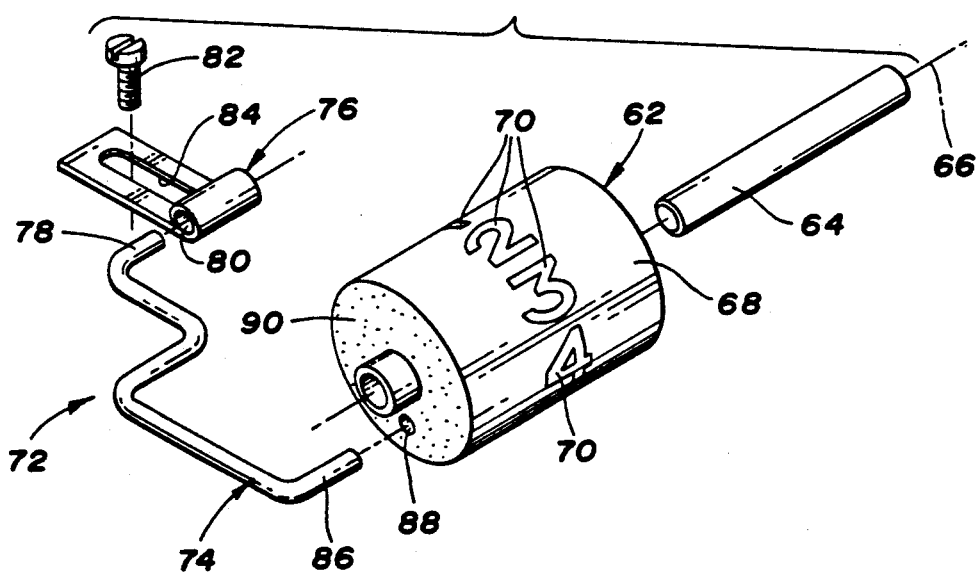
FIG. 4 is an exploded perspective view of a portion of FIG. 3.

As seen best in FIGS. 2-4, a decorative bezel or shroud 54 is rigidly supported on the tilt-housing 22 and includes a viewing port 56 visible by a driver through the steering wheel 24 when the steering column 18 is installed in the passenger compartment. A bracket 58 is rigidly attached to the tilt-housing behind the shroud 54 and includes a pair of laterally spaced arms, only a single arm 60 being shown in FIG. 3. A cylindrical drum 62 is supported on a pin 64 between the arms of the bracket 58 for rotation about a second transverse axis 66 of the steering column. An outer cylindrical wall 68 of the drum 62 defines an indicator surface behind the viewing port 56. A plurality of position indicating graphic symbols 70 are defined on the outer wall 68 and, when observed from outside the shroud, traverse or scroll across the viewing port 56 when the drum rotates about the second transverse axis 66.

The portion of the indicator surface of the drum 62 visible through the viewing port 56 is determined by a synchronizing apparatus 72 including a connecting rod 74 and an attaching clip 76, FIGS. 3-4. The connecting rod 74 has an inboard hooked end 78 received in a cylindrical bore 80 of the attaching clip such that the rod is pivotable about the centerline of the bore 80. The attaching clip is clamped to the yoke 28 by a screw 82 received in an adjusting slot 84 in the clip. The rod 74 has an outboard hooked end 86 journaled in a bore 88 in a side 90 of the drum 62 offset from or eccentric relative to the second transverse axis 66. When the tilt-housing pivots between its high and low limit positions, the connecting rod 74 effects rotation of the drum 62 and movement of the indicator surface defined by the outer wall 68 of the drum relative to the viewing port 56.

The drum 62 is adjusted to expose a predetermined one of the graphic symbols 70 in the viewing port 56 by shifting the attaching clip 76 relative to the yoke 28 in the direction of the slot 84. When an appropriate symbol is visible in the viewing port, the screw 82 is tightened. Thereafter, when the driver moves the latch shoe 46 to its unlatched position and pivots the tilt-housing, successive position indicating symbols 70 are observed in the viewing port. When a symbol appears which the driver associates with a comfortable position of the steering wheel, the latch shoe is released to maintain the selected position.

The spacing between the symbols 70 may be coordinated with the positions of the notches 48 to center respective ones of the symbols in the viewing port in corresponding ones of the adjusted positions of the tilt-housing defined by the notches. If the tilt-housing is infinitely adjustable, a scale or continuum of position indicating symbols may be provided on the indicator surface defined by the outer wall 68 of the drum.

Figure 5:
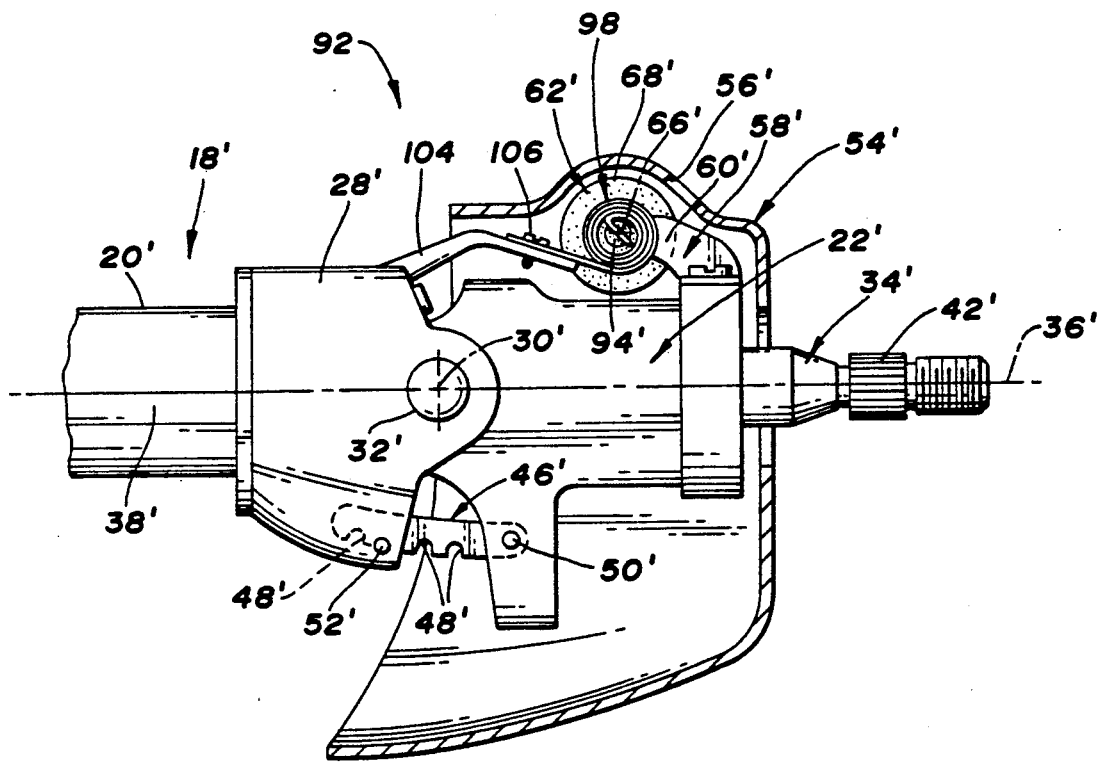
FIG. 5 is similar to FIG. 3 but showing a modified steering column according to this invention.
Figure 6:
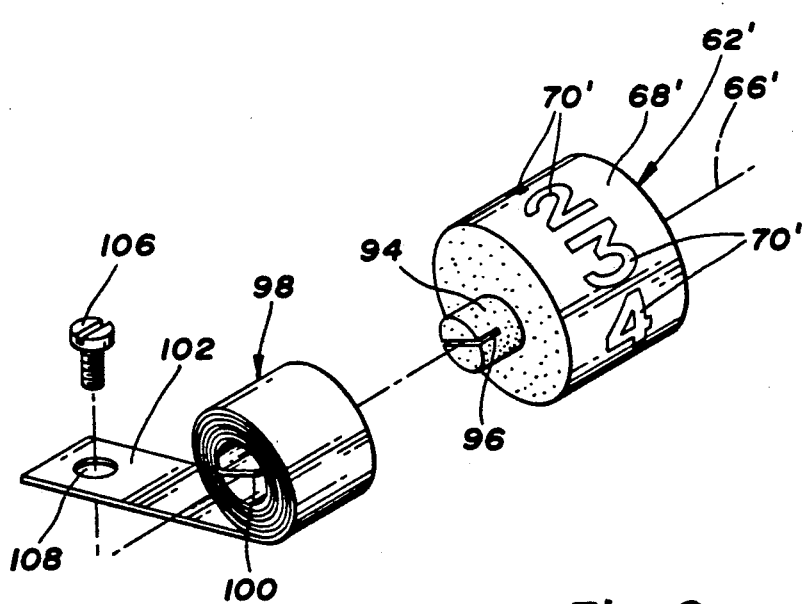
FIG. 6 is an exploded perspective view of a portion of FIG. 5.

A modified steering column 92 according to this invention is illustrated in FIGS. 5-6. Structural elements common to the steering column 18 described above and to the modified steering column 92 are identified by primed reference characters. The modified steering column 92 includes a mast 20', a tilt-housing 22' supported on the mast for pivotal movement about a first transverse axis 30', and a latch shoe 46' supported on the tilt-housing for pivotal movement between latched and unlatched positions relative to a striker 52'. The latch shoe 46' has a plurality of notches 48' therein which define a corresponding plurality of adjusted positions of the tilt-housing 22' between high and low limit positions of the latter.

A bracket 58' on the tilt-housing 22' supports a drum 62' on the tilt-housing for rotation about a second transverse axis 66'. The drum has an outer cylindrical wall 68' defining an indicator surface behind a viewing port 56' in a shroud 54' on the tilt-housing. A plurality of graphic symbols 70' are defined on the indicator surface of the drum and traverse or scroll across the viewing port 56' when the drum rotates about the second transverse axis 66'.

The drum 62' has a center shaft 94 which extends beyond an arm 60' of the bracket 58'. The center shaft has a notch 96 in an end surface thereof. A flat, coil spring 98 is wrapped around the center shaft 94 and has a first or inside end 100 received in the notch 96 in the center shaft. A second or outside end 102 of the flat spring 98 is attached to a stationary bracket 104 on the yoke 28' by a screw 106 through a hole 108.

The modified steering column 92 operates essentially like the steering column 18. As the tilt-housing 22' pivots between its high and low limit positions, the flat spring 98 coils and uncoils relative to the fixed bracket 104. As the spring 98 coils and uncoils, the drum 68' is rotated about the second transverse axis 66' to move successive ones of the symbols 70' into the viewing port 56'. The spring 98 is self-biased toward a coiled condition and, therefore, winds itself about the second transverse axis as the tilt-housing pivots toward its high limit position.

The embodiments of the invention in which an exclusive property or privilege is claimed are defined as follows:

1. A steering column comprising:
    a stationary mast,
    a tilt-housing supported on a distal end of said stationary mast for pivotal movement about a first transverse axis of said mast through a plurality of adjusted positions between an upper limit position and a lower limit position,
    latch means for capturing said tilt-housing in selected ones of said adjusted positions,
    a shroud rigidly attached to said tilt-housing and including a viewing port,
    means defining an indicator surface having a plurality of position indicating graphic symbols thereon corresponding to said selected ones of said adjusted positions of said tilt-housing,
    means mounting said indicator surface on said tilt-housing behind said shroud for movement relative thereto so that said graphic symbols on said indicator surface scroll across said viewing port, and
    synchronizing means between said indicator surface and said mast operative to effect movement of said indicator surface relative to said tilt-housing when said tilt-housing pivots about said first transverse axis so that said graphic symbols on said indicator surface concurrently scroll across said viewing port.

2. The steering column recited in claim 1 wherein
    said means defining an indicator surface having a plurality of position indicating graphic symbols thereon corresponding to said selected ones of said adjusted positions of said tilt-housing includes,
    a drum having a cylindrical outer wall with said graphic symbols arrayed around said drum on said cylindrical outer wall, and
    said means mounting said indicator surface on said tilt-housing behind said shroud for movement relative thereto so that said graphic symbols on said indicator surface scroll across said viewing port includes,
    a bracket means rigidly attached to said tilt-housing and defining a second transverse axis parallel to said first transverse axis, and
    means mounting said drum on said bracket means for rotation about said second transverse axis.

3. The steering column recited in claim 2 wherein
    said synchronizing means between said indicator surface and said mast operative to effect movement of said indicator means relative to said tilt-housing when said tilt-housing pivots about said first transverse includes,
    a connecting rod,
    means pivotally attaching a first end of said connecting rod to said mast, and means pivotally attaching a second end of said connecting rod to a side of said drum at a location on said drum eccentric relative to said second transverse axis.

4. The steering column recited in claim 2 wherein said synchronizing means between said indicator surface and said mast operative to effect movement of said indicator means relative to said tilt-housing when said tilt-housing pivots about said first transverse includes, means defining a center shaft on said drum aligned on said second transverse axis, a flat coil spring disposed around said center shaft and including an inner end and an outer end, means connecting said inner end of said flat coil spring to said center shaft so that coiling and uncoiling of said coil spring effects rotation of said drum about said second transverse axis, and means rigidly connecting said outer end of said coil spring to said mast so that said coil spring coils and uncoils concurrently with pivotal movement of said tilt-housing about said first transverse axis.

* * * * *